United States Patent [19]
Richardson et al.

[11] Patent Number: 5,499,700
[45] Date of Patent: Mar. 19, 1996

[54] DOUBLE WRAP BRAKE BAND WITH BREAK-AWAY TIES

[75] Inventors: Darrel Richardson, Peotone; Anthony J. Grzesiak, Sauk Village; David T. Vierk, Lansing, all of Ill.

[73] Assignee: Borg-Warner Automotive, Inc., Sterling Heights, Mich.

[21] Appl. No.: 356,009

[22] Filed: Dec. 14, 1994

[51] Int. Cl.⁶ .................................................. F16D 49/02
[52] U.S. Cl. ...................... 188/77 W; 188/259; 188/241; 403/2
[58] Field of Search ..................... 188/77 R, 77 W, 188/241, 249, 250 H; 192/80, 107 T; 403/2

[56] References Cited

U.S. PATENT DOCUMENTS

| | | | |
|---|---|---|---|
| 2,841,864 | 7/1958 | Kelly | 29/418 |
| 2,867,898 | 1/1959 | Vosler et al. | 29/416 |
| 2,958,230 | 11/1960 | Haroldson | 74/230 |
| 3,265,166 | 8/1966 | Lavengood | 188/250 |
| 3,386,535 | 6/1968 | Bishop et al. | 188/77 |
| 3,399,749 | 9/1968 | Baule | 188/259 |
| 4,212,094 | 7/1980 | Pray | 403/2 |
| 4,363,385 | 12/1982 | Schlanger | 188/249 |
| 4,581,803 | 4/1986 | Blinks et al. | 29/418 |
| 4,602,706 | 7/1986 | Blinks et al. | 188/259 |
| 4,757,880 | 7/1988 | Grzesiak | 188/77 |
| 4,923,319 | 5/1990 | Dent | 403/2 |
| 5,012,905 | 5/1991 | Tanaka | 188/250 |
| 5,083,642 | 1/1992 | Stefanutti et al. | 188/77 |

FOREIGN PATENT DOCUMENTS

| | | | |
|---|---|---|---|
| 1248884 | 1/1989 | Canada | F16D 49/00 |
| 1248885 | 1/1989 | Canada | F16D 49/00 |
| 0230727 | 8/1987 | European Pat. Off. | F16H 57/10 |
| 0540156 | 5/1993 | European Pat. Off. | F16D 65/04 |
| 7639595 | 9/1978 | France | F16D 49/12 |
| 2532349 | 2/1977 | Germany | F16D 65/04 |
| 2108014 | 5/1983 | United Kingdom | B38P 17/00 |
| WO9111635 | 8/1991 | WIPO | F16D 65/04 |

*Primary Examiner*—Robert J. Oberleitner
*Assistant Examiner*—Chris Schwartz
*Attorney, Agent, or Firm*—Emch, Schaffer, Schaub et al.; Greg Dziegielewski

[57] ABSTRACT

The invention provides a double wrap brake band consisting of three band segments which are held together by tie members designed to break-away under shear forces applied by the apply pin and reaction or anchor member during operation of the transmission assembly. The break-away tie members hold the three band segments together to form a structurally sound cylindrical band during assembly of the transmission. The tie segments are then sheared the first time the band is actuated by the apply and reaction pins.

9 Claims, 4 Drawing Sheets

DOUBLE WRAP BRAKE BAND WITH BREAK-AWAY TIES

TECHNICAL FIELD

The present invention relates to a double wrap brake band for use with transmission assemblies wherein the individual band segments are engaged together with tie members during manufacturing and assembly of the band into the transmission. Upon first use of the transmission, the tie members are sheared, thus allowing the individual bands to freely operate within the transmission assembly.

Double wrap brake bands are well known in the transmission art as evidenced by U.S. Pat. Nos. 4,581,803, 4,602,706 and 4,757,880. Each of the identified patents discloses a double wrap brake band for use in automatic transmissions wherein the band is formed from a preslotted and preformed strap divided into three individual band members held together by transversely oriented spaced ties. Commonly, prior to insertion into a transmission assembly the ties are punctured or broken thus separating the three bands. The three separated bands and the apply and reaction bracket assemblies are then inserted into the transmission during manufacture of the transmission. There is currently a trend in the manufacture of transmission bands to optimize the cross section of the band material to provide thin, lighter weight and more responsive transmissions. This trend toward bands of thinner cross section has provided problems during the assembly of transmissions. Once the tie members located between the three bands of the strap assembly are broken, the thin cross section band material has a tendency to become somewhat flimsy, thereby allowing the bands to sag and fail to form a cylindrical shape into which the transmission drum can be inserted. Such flimsy and deformed bands create problems during assembly of the transmission.

Therefore, a need has arisen for the provision of a double wrap transmission band assembly which can be manufactured from the currently accepted thinner cross section materials, yet is capable of maintaining its cylindrical shape during assembly into the transmission.

SUMMARY OF THE INVENTION

The present invention provides a double wrap band consisting of three band segments which are held together by tie members designed to break-away under shear forces applied by the apply pin and reaction or anchor member during operation of the transmission assembly. The break-away tie members hold the three band segments together to form a structurally sound cylindrical band during assembly of the transmission. The tie segments are then sheared the first time the band is actuated by the apply and reaction pins.

It is an objective of the present invention to provide a lightweight transmission band having sufficient rigidity to maintain its cylindrical shape during insertion into a transmission assembly.

It is further an object of the present invention to provide a double wrap transmission band which maintains the individual band segments in proper alignment with one another during insertion into the transmission assembly.

Yet another object of the present invention is to provide a double wrap transmission band wherein the individual band segments are joined together after the band is installed in the transmission assembly by tie members which are sheared during the first operation of the transmission band within the transmission assembly.

Yet another object of the present invention is to provide a double wrap transmission band having tie members that once broken or sheared never return to the same position and, therefore, cannot interfere in the smooth independent operation of the three band segments of the transmission band.

A final object of the present invention is to provide a double wrap transmission band having tie members that are sheared or broken during the first operation of the transmission band leaving no sharp edges to the broken tie members which would interfere with the operation of the transmission assembly.

These objects and others are met by the present invention which is described fully in the following description of the preferred embodiment and best mode with reference to the accompanying drawings.

DETAILED DESCRIPTION OF THE PREFERRED EMBODIMENT AND BEST MODE

Figure 1:
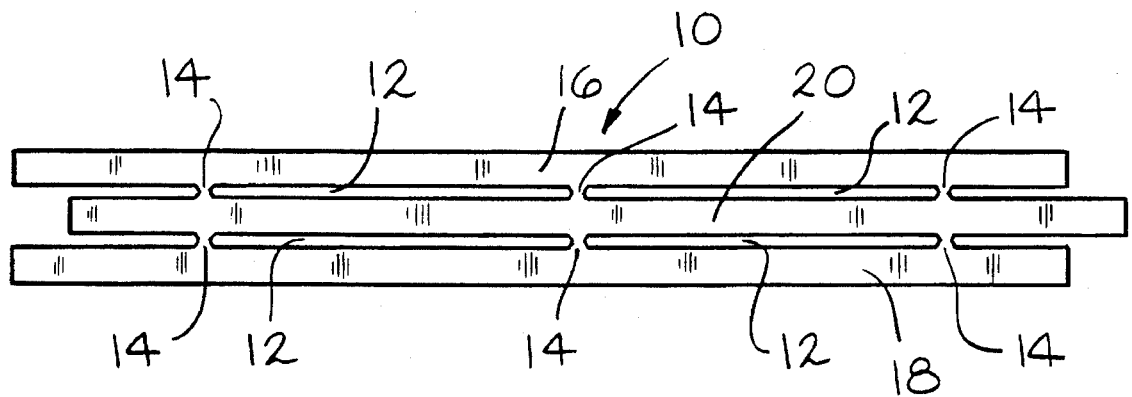
FIG. 1 is a top view of double wrap band assembly prior to formation of the band into a cylinder for insertion into the transmission assembly.
Figure 2:
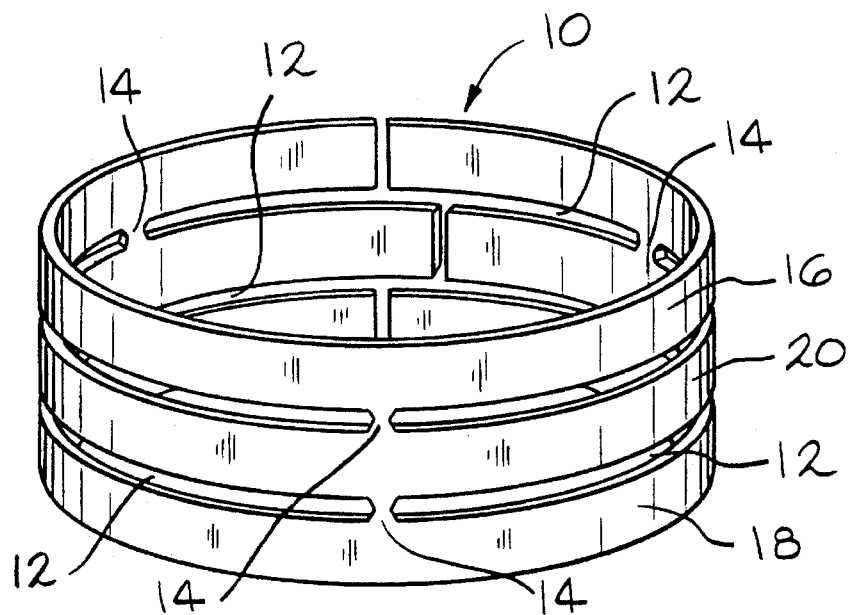
FIG. 2 is a perspective view of the double wrap band assembly of the present invention in a cylindrical shape.

The double wrap brake band assembly as shown in FIG. 1 discloses a preslotted flat strap 10 which forms the basic structure for the final double wrap brake product. The strap member 10 includes longitudinally extending parallel slots 12 which extend the length of the strap member 10 and are separated by transversely aligned tie members 14. The strap member 10 and slots 12 combine to create a pair of outside parallel band segments 16, 18 separated by an inside or middle band segment 20. Preferably the middle band segment 20 is longitudinally shifted with respect to the outside bands 16, 18 to provide appropriate surfaces for the installation of apply and reaction bracket members to the band (not shown). FIG. 2 shows the flat strap member 10 of FIG. 1 in its cylindrical configuration prior to attachment of the bracket assemblies which form the final product. The tie members 14 assist in maintaining the outside band segments 16, 18 and the middle segment 20 in the desired cylindrical alignment.

Figure 3:
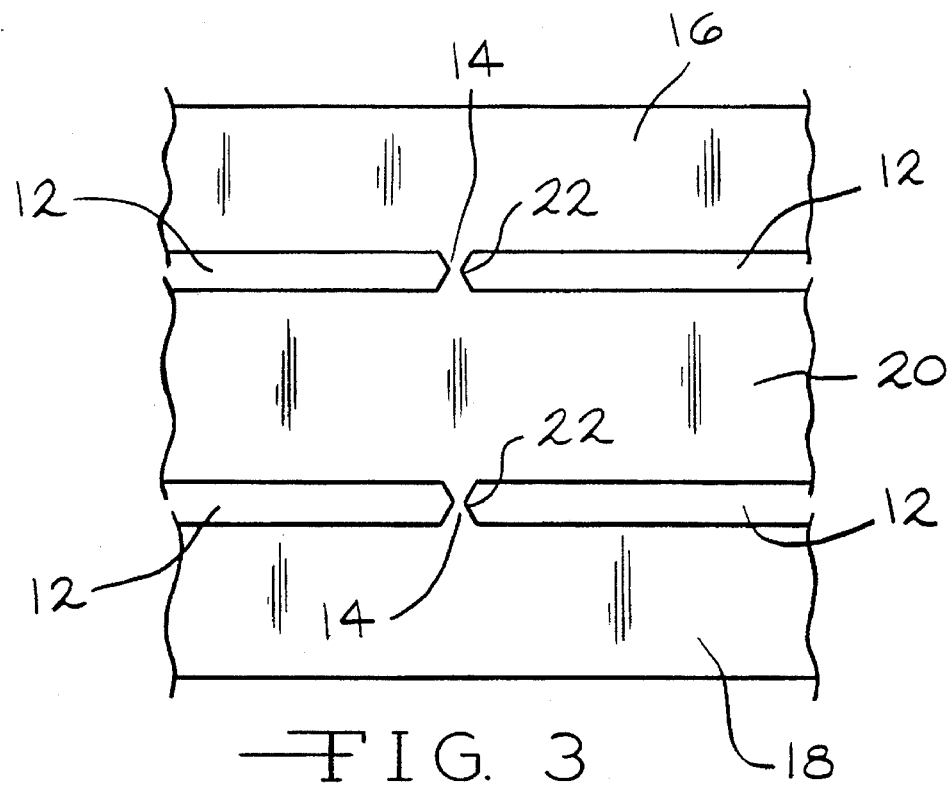
FIG. 3 is a sectional view of the tie members of the double wrap band assembly of the present invention.
Figure 3A:
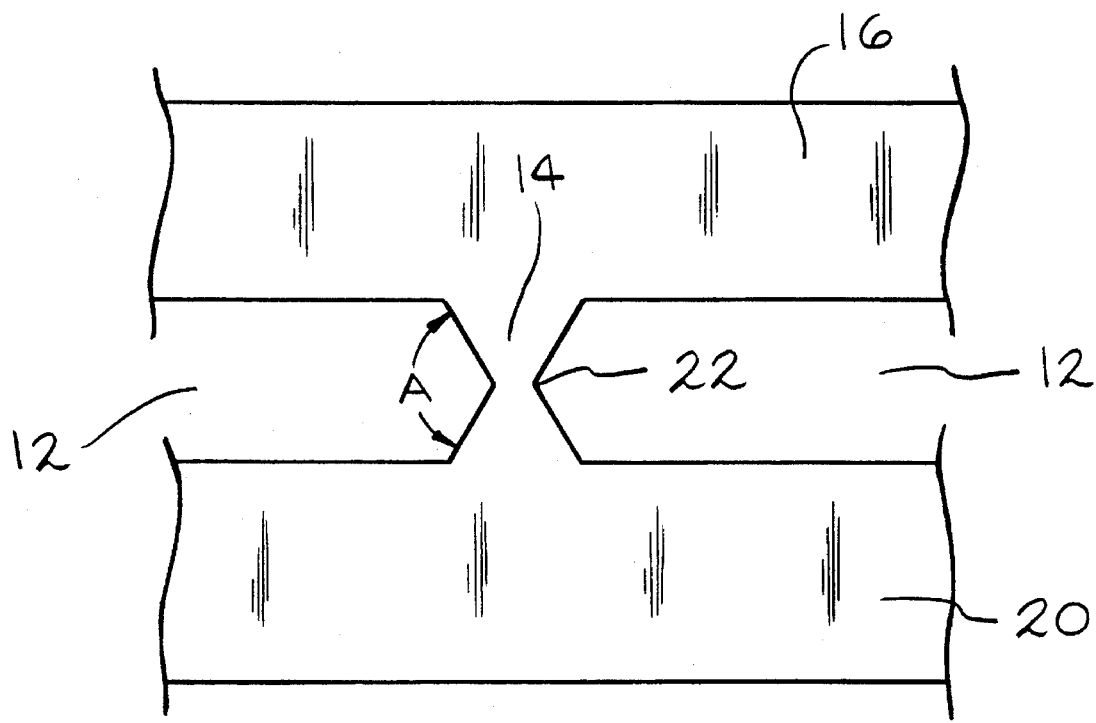
FIG. 3A is a detailed view of a tie member of the double wrap band assembly of the present invention.

Referring now to FIGS. 3 and 3A, the tie members 14 of the present invention are shown in detail. The preferred embodiment and best mode of the tie member is formed in an hour-glass shape. The tie member 14 includes a waist 22 which provides a weakened area which shears under forces applied by the reaction and apply members to the band during initial operation of the band within the transmission. Preferably, the waist 22 is about 0.050 inches across. The hour-glass shape of the tie members 14 provides for an angle A which is about 120°.

Figure 3B:
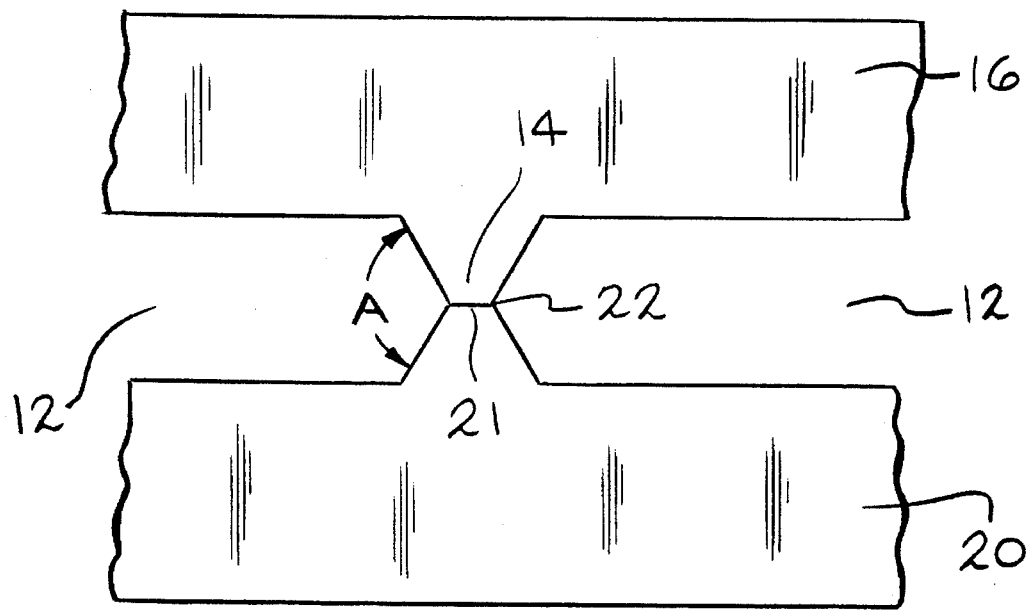
FIG. 3B is a detailed view of an alternative embodiment of a tie member of the double wrap brake band assembly of the present invention.
Figure 3C:
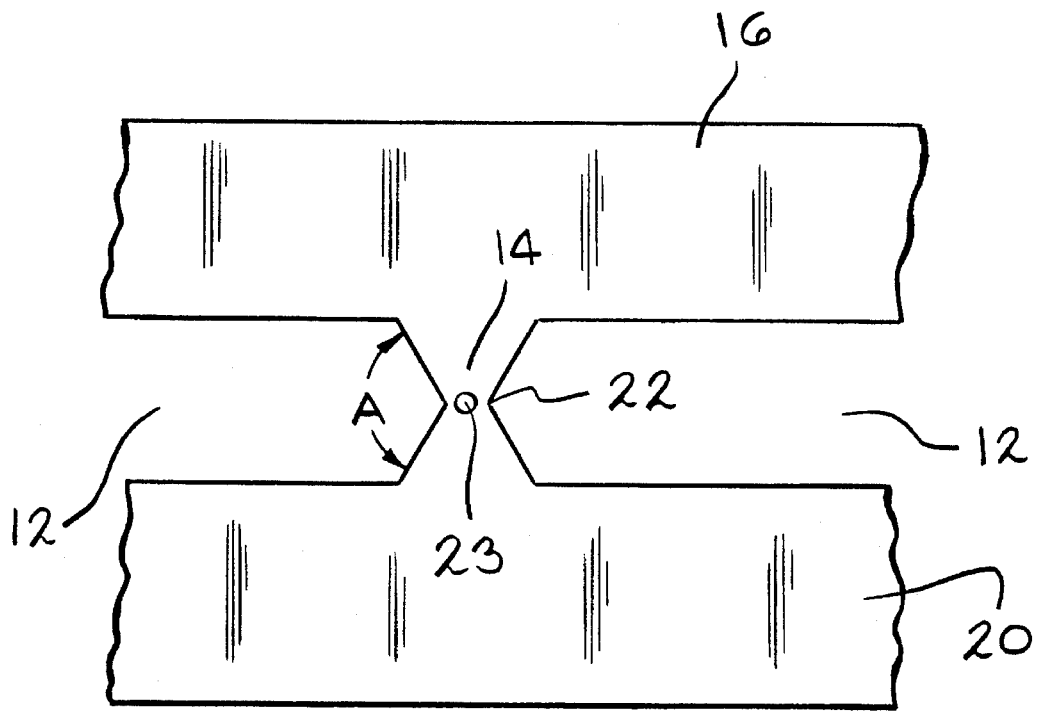
FIG. 3C is a detailed view of another alternative embodiment of a tie member of the double wrap brake band assembly of the present invention.

A preferred alternative embodiment to the present invention, as shown in FIG. 3B, envisions a tear line 21 scored across the waist 22 of the tie member 14. The scored tear line 21 provides an additionally weakened area for guiding the shearing action during the breaking of the tie members 14. Another alternative embodiment, as shown in FIG. 3C, envisions the placement of a perforation or hole 23 within the waist 22 of the tie member. The perforation or hole 23 further weakens the waist 22 area which is subjected to the shearing forces. Other methods of weakening the tie member 14, such as notching the tie member 14, may also be utilized with similar results.

Figure 4:
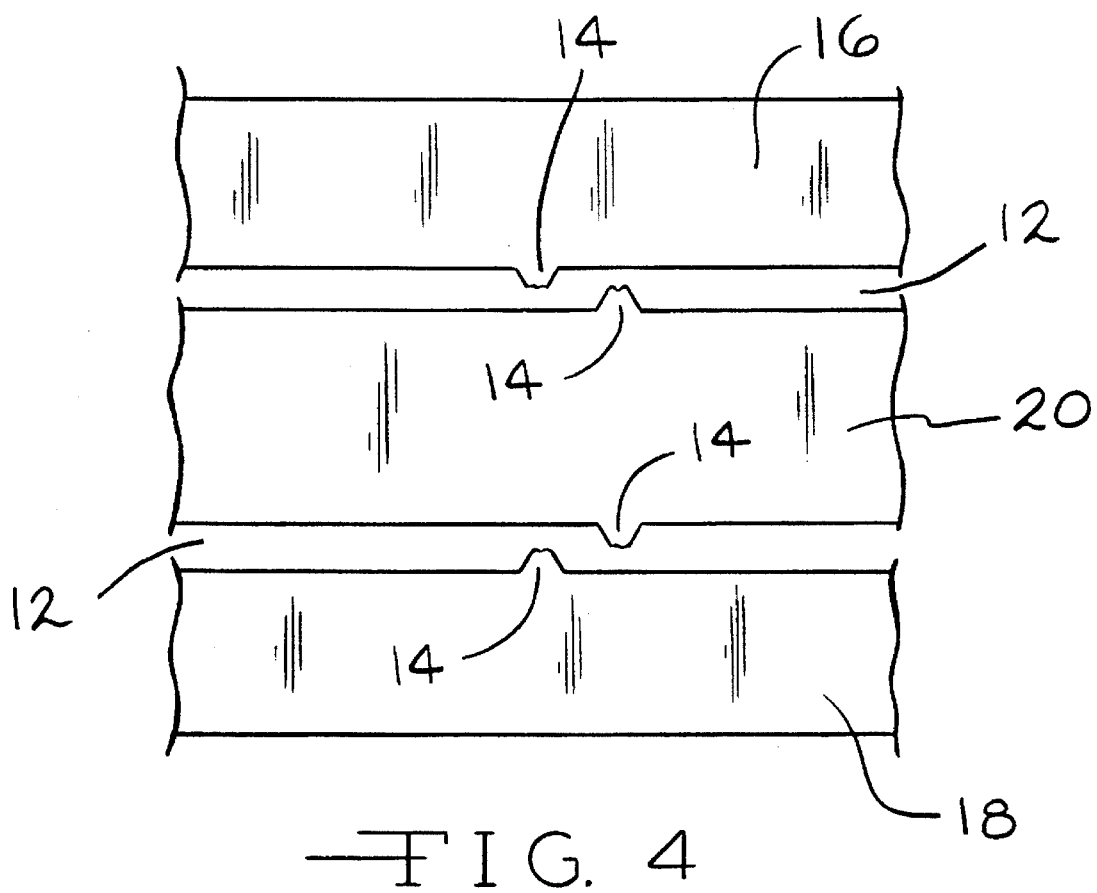
FIG. 4 is a sectional view showing the tie members of the double wrap brake band assembly of the present invention after they have been sheared by forces applied from the apply member and reaction member of the transmission assembly.

In operation, the band assembly as shown in FIG. 2 receives apply and reaction brackets prior to insertion into the transmission assembly (not shown). The cylindrical band 10 consisting of the three segments 16, 18 and 20 and tie members 14 is then easily inserted into the transmission assembly about the transmission drum. Once in the assembly, the apply and reaction members of the transmission assembly are pressed against the apply and reaction brackets of the band to test the band member. The forces applied by the apply and reaction members to the apply and reaction brackets cause the tie members 14 to shear or break away at the waist 22, as shown in FIG. 4. Once the strap member 10 has had forces applied by the apply and reaction members, the band segments 16, 18, 20 remain in a cylindrical configuration having a slightly smaller circumference than when the band was first inserted into the transmission assembly. Thus, the tie members 14 which have been sheared at the waist 22 will remain juxtaposed to one another and not interfere with one another during operation of the transmission band, as shown in FIG. 4.

The above description of the preferred embodiment and best mode of this invention is intended to be illustrative and not limiting upon the scope of the following claims.

We claim:

1. A double wrap brake band for use with an automatic transmission having an apply member and a reaction member, comprising in combination:

an elongated strap member having a first band and a second band, the first band being generally parallel to the second band and defining a first slot therebetween, the first and second bands being adjoined together by at least one tie member;

a third band positioned parallel to the first band, the first band being positioned between the second and third bands, the third band being generally parallel to the first band to form a second slot therebetween, the first and third bands being adjoined together by at least one tie member;

wherein the apply member is engaged with at least one of the three bands and the reaction member is engaged with the remaining bands and relative movement of the apply member with respect to the reaction member creates movement of the second and third bands with respect to the first band thereby causing the tie members to shear and release the engagement between the first and second and the first and third band members.

2. The double wrap brake band of claim 1, wherein the tie members are positioned in transverse alignment with respect to each other prior to the tie members being sheared.

3. The double wrap brake band of claim 1, wherein the tie members are positioned to be transversely non-aligned prior to the tie members being sheared.

4. The double wrap brake band of claim 1, wherein the tie members are hour-glass shaped having a narrow waist portion which is subjected to shearing forces upon relative movement between the first and second and the first and third bands.

5. The double wrap brake band of claim 4, wherein the hour-glass shape of the tie member includes sides which are spaced 120° apart.

6. The double wrap brake band of claim 4, wherein the waist is 0.050 inches across.

7. The double wrap band of claim 4 wherein the waist includes a tear line scored into the band material.

8. The double wrap band of claim 4, wherein the waist includes a hole perforated through the band material.

9. The double wrap band of claim 1, wherein the tie members include a weakened area of band material designed to shear under the forces applied to the band.

* * * * *